United States Patent [19]
Shultz

[11] Patent Number: 5,810,905
[45] Date of Patent: Sep. 22, 1998

[54] PROCESS FOR MAKING PIG IRON

[75] Inventor: Richard L. Shultz, Westlake, Ohio

[73] Assignee: Cleveland Cliffs Iron Company, Cleveland, Ohio

[21] Appl. No.: 726,812

[22] Filed: Oct. 7, 1996

[51] Int. Cl.⁶ .................................................. C21B 11/10
[52] U.S. Cl. ...................... 75/10.46; 75/10.63; 75/10.66; 75/466
[58] Field of Search .......................... 75/445, 446, 10.63, 75/10.46, 10.66

[56] References Cited

U.S. PATENT DOCUMENTS

| | | |
|---|---|---|
| Re. 34,418 | 10/1993 | Bates et al. . |
| 2,752,234 | 6/1956 | Shipley . |
| 2,893,839 | 6/1959 | Schytil . |
| 2,894,831 | 7/1959 | Old et al. . |
| 3,031,293 | 4/1962 | Meissner . |
| 3,140,940 | 7/1964 | Keith . |
| 3,167,419 | 1/1965 | Wittman et al. . |
| 3,210,180 | 10/1965 | Jukkola . |
| 3,224,870 | 12/1965 | Johnson et al. . |
| 3,295,956 | 1/1967 | Whaley . |
| 3,346,365 | 10/1967 | Mayer et al. . |
| 3,347,659 | 10/1967 | Volk et al. . |
| 3,374,087 | 3/1968 | Gray . |
| 3,554,733 | 1/1971 | Colombo et al. . |
| 3,591,363 | 7/1971 | Campbell . |
| 3,620,455 | 11/1971 | Berry . |
| 3,637,368 | 1/1972 | Bessant . |
| 3,649,245 | 3/1972 | Columbo et al. . |
| 3,758,293 | 9/1973 | Viviani et al. . |
| 3,761,244 | 9/1973 | Hoffert . |
| 3,864,465 | 2/1975 | Hoffert . |
| 3,896,560 | 7/1975 | Knepper . |
| 3,928,021 | 12/1975 | Matsubura et al. . |
| 3,953,199 | 4/1976 | Michaelis . |
| 3,984,229 | 10/1976 | Gorling . |
| 3,998,625 | 12/1976 | Koros . |
| 4,007,034 | 2/1977 | Hartwig et al. . |

(List continued on next page.)

FOREIGN PATENT DOCUMENTS

| | | |
|---|---|---|
| 876526 | 7/1971 | Canada . |
| 594557 | 4/1994 | European Pat. Off. . |
| 1154817 | 9/1963 | Germany . |

OTHER PUBLICATIONS

"Aspects of Smelting Pig Iron in Electronic Reduction Furnace", Loe, L.T., pp. 1–30, 1969. Month Unavailable.

"Basic Concepts in the Electric Smelting of Ferroalloys", *Electric Furnaces Proceedings*, J. Yonemochi, pp. 73–77, 1976. Month Unavailable.

"Beach Sand Project for S. Africa", *Mining Magazine*, pp. 425–433, 1976. Month Unavailable.

"Commissioning of the New Iron Plant at New Zealand Steel", Dr. K.A. Holborow, pp. 35–43, 1987. Month Unavailable.

"Granulation of Ferroalloys and Si–Metal", *Electric Furnace Conference Proceedings*, P–A Lundstrom and Ake West, pp. 309–315, 1994. Month Unavailable.

"Ilmenite Direct Reduction Project In Norway Using the Grate–Car Process", *Boliden Allis, Inc.*, R.C. Nigh et al., pp. 1–6, 1991. Month Unavailable.

"Iron–and Steelmaking in Soderberg Electric Arc Furnaces", *Ironmaking and Steelmaking*, G.P. Crawford, vol. 16 No. 5, pp. 314–319, 1989. Month Unavailable.

"Kobe Steel Discovers Faster Molten Iron Process", *Agence France–Presse*, Jul. 24, 1996.

"Kobe Steel Develops New Way of Making Molten Iron", *Japan Economic Newswire*, Jul. 24, 1996.

(List continued on next page.)

*Primary Examiner*—Melvyn Andrews
*Attorney, Agent, or Firm*—Watts Hoffmann Fisher & Heinke

[57] ABSTRACT

A process for producing pig iron from iron ore fines wherein the fines are partially reduced in a fluid bed reactor and, without pelletizing, briquetting or otherwise agglomerating the partially reduced fines, injecting them with a lance below the surface of a bath of a submerged arc furnace.

26 Claims, 1 Drawing Sheet

U.S. PATENT DOCUMENTS

| | | | |
|---|---|---|---|
| 4,008,074 | 2/1977 | Rossner et al. | 75/532 |
| 4,045,214 | 8/1977 | Wetzel et al. . | |
| 4,053,301 | 10/1977 | Stephens, Jr. | 75/10.61 |
| 4,082,545 | 4/1978 | Malgarini et al. . | |
| 4,224,056 | 9/1980 | Tomizawa . | |
| 4,427,186 | 1/1984 | Buhrmann . | |
| 4,551,172 | 11/1985 | Formanek et al. | 75/10.34 |
| 4,575,393 | 3/1986 | Bates et al. . | |
| 4,601,749 | 7/1986 | Yamada et al. . | |
| 4,653,730 | 3/1987 | Wunsche et al. . | |
| 4,701,215 | 10/1987 | Bates et al. . | |
| 4,746,103 | 5/1988 | Takashiba et al. . | |
| 4,874,427 | 10/1989 | Hamada et al. . | |
| 4,948,477 | 8/1990 | Gibson et al. . | |
| 5,073,194 | 12/1991 | Stephens et al. . | |
| 5,088,696 | 2/1992 | Desaar . | |
| 5,185,032 | 2/1993 | Whipp . | |
| 5,251,879 | 10/1993 | Floyd . | |
| 5,296,015 | 3/1994 | Beccerra-Novoa et al. . | |
| 5,298,053 | 3/1994 | Griffing . | |
| 5,366,897 | 11/1994 | Hager et al. . | |
| 5,407,179 | 4/1995 | Whipp . | |
| 5,431,711 | 7/1995 | Meissner et al. . | |
| 5,527,379 | 6/1996 | Hirsch et al. . | |

OTHER PUBLICATIONS

"Lurgi's New Fine Iron Ore Direct Reduction Technologies For Australasia", R. Husain, Dr. P. Weber, Ferrous Metallurgy Division and Lurgi Metallurgie GmbH, pp. 1–16, presentation at the Asian Steel Summit, Hong Kong, 1995. Sep.

"The Highveld Project", *Steel Times*, I. Cairns, pp. 377–403, Jun., 1970.

"P7 Current Status and Commercial Potentials of Smelt–Reduction Technologies", *2nd European Ironmaking Congress*, B.R. Nijhawan, pp. 337–346, 1989. Month Unavailable.

"Some Significant Metallurgical Aspects of the Smelting of Pig Iron in Electric Furnaces", *The Canadian Mining and Metallurgical Bulletin*, H. C. Anderson, vol. LXVI, pp. 263–270, 1963. Apr.

"The Quebec Iron and Titanium Smelting Process", D. Poggi, pp. 1–22.

"The Tyssedal Ilmenite Smelting Process", *Proceedings on the Norwegian Conference on Ilmenite Smelter*, J. Johan Solheim, pp. 177–199, 1988. Month Unavailable.

"Titanium and Q.I.T.", *Mining in Canada Magazine*, R. Guimond, Nov., 1964.

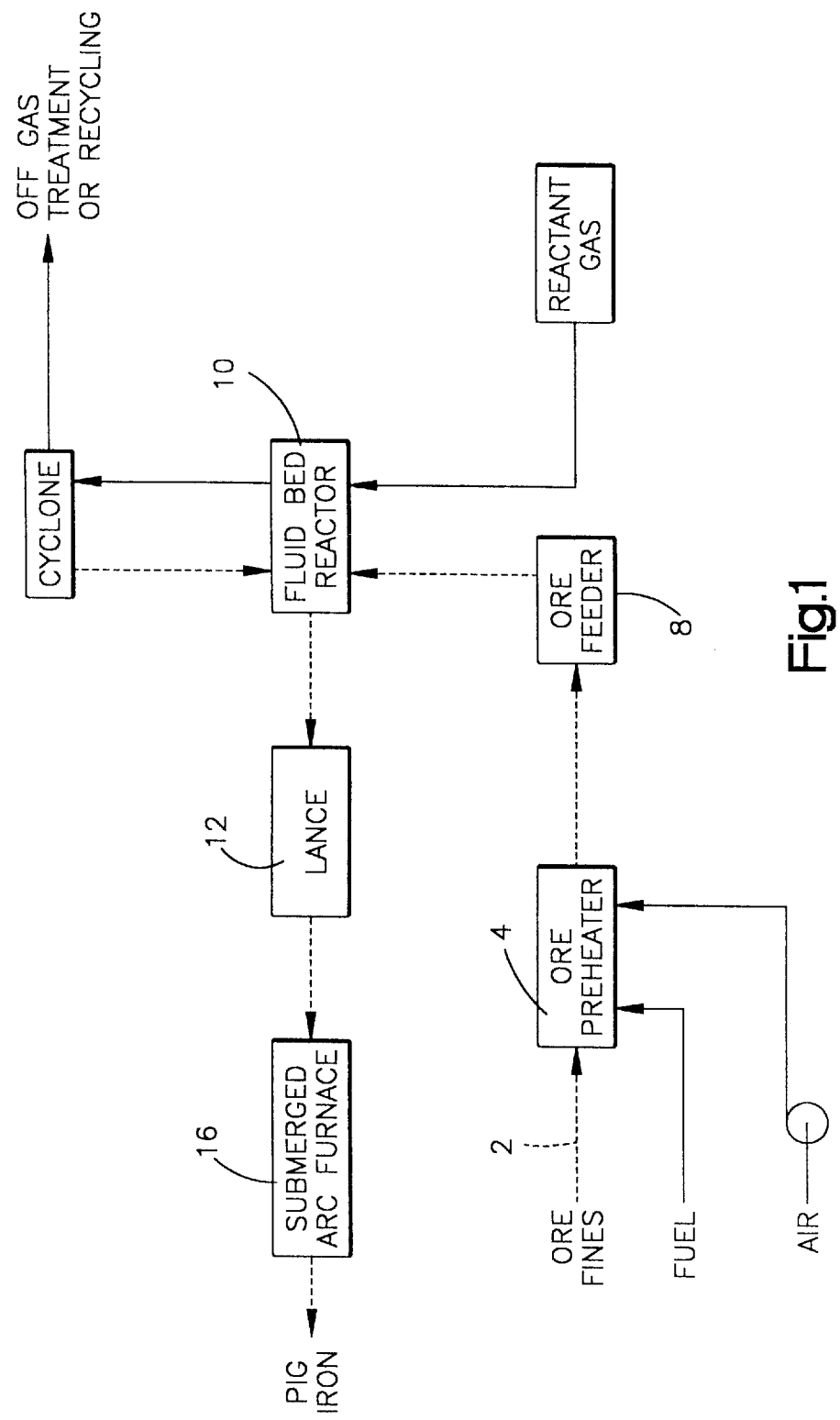

PROCESS FOR MAKING PIG IRON

FIELD OF THE INVENTION

This invention relates generally to a process for converting ore fines containing iron oxide to pig iron, and more specifically to a process for converting ore fines containing iron oxide to pig iron by injecting pre-reduced fines discharged from a fluid bed reactor below the surface of the bath of a submerged arc furnace.

BACKGROUND OF THE INVENTION

Pig iron is a desired raw material used for making steel and is traditionally supplied by a blast furnace. Blast furnaces are energy intensive, and recent emphasis has focused on the utilization of alternative technologies to advantageously produce raw materials required for steelmaking. So-called direct reduction processes are a source of direct reduced iron (DRI) that substitutes for scrap as a raw material in electric furnace steelmaking. Cold pig iron and iron carbide are other preferred feed components in the production of steel. A charge of pig iron or iron carbide and a reduced amount of scrap can be converted directly to steel in a BOF, a ladle furnace, an electric arc furnace (EAF) or the like, providing significant environmental and economic advantages, especially when the price of high quality scrap is high. However, neither DRI nor iron carbide have supplanted pig iron as a feed stock in the manufacture of steel.

The low cost and ready availability of ore fines containing iron oxide has led to the production of iron carbide and DRI in fluid bed reactors using the fines as reactor feed. The fluid bed reactors exploit the large surface area available for mass transfer presented by fines. However, many fluid beds, especially of the bubbling type, have been hampered by strict particle size tolerances. While smaller particles increase the amount of surface area available to participate in the mass transfer reaction, reduction in the particle size of the fines undesirably increases the rate of reoxidation upon exposure of the fines to an ambient environment. Fine size also presents transportation issues, with smaller fines entrained in ambient air currents or spilled at transfer points resulting in loss of product. Briquetting, green balling and pelletizing partially reacted and/or partially reduced fines prior to charging into a furnace have been used to address some of these issues, but these agglomeration processes add material and capital costs to the production of suitable raw materials for steelmaking using partially reacted and partially reduced fines as intermediate products.

Submerged arc furnaces are not known to produce commercial amounts of pig iron using ore fines from 0.025 to 3 mm. in size that have been partially reduced in a fluidized bed reactor as feed material. The construction and operation of submerged arc furnaces to produce ferromanganese, ferrosilicon and other ferroalloys is known. Submerged arc furnaces have the benefit of requiring relatively low capital outlay for initial construction, and are flexible in operation due to relatively quick on-off ability resulting from electrical power as the primary energy source. Submerged arc furnaces normally receive an agglomerated feed material or partially reduced lump ore feed.

Submerged arc furnaces have encountered operating difficulties when called upon to accommodate high loadings of fines. Top charging of powdery fines into a submerged arc furnace is impractical and inefficient since the powdery fines tend to congregate on the surface of the slag and inhibit gas flow, resulting in slag boils. Top loaded powdery fines can also become entrained in the outflow of gases escaping the furnace resulting in product loss and the potential for environmental hazard from the discharge. Moreover, the slag layer in a submerged arc furnace is very thick, which further hinders effective top charging of fines.

The abundance of ore fines containing iron oxides has led to proposals to produce pig iron by charging pre-reduced iron ore fines into so-called vertical melt-reducing furnaces through tuyeres within the furnace walls. However, smaller fines are not amenable to introduction through tuyeres, and can cause blockage. Moreover, vertical melt-reducing furnaces are not as environmentally or economically advantageous as other more desirable technologies, such as submerged arc furnaces. Conversely, submerged arc furnaces generally do not have tuyeres that could be used to introduce fines and, even if they could be so modified, they still would not provide effective means for using smaller fines.

Another proposal for producing iron provides for dropping pre-reduced fines from a fluidized bed into the top of a gasifier/smelter. The fines are further reduced and heated as they fall through the gases in the upper level of the vessel. The gases are produced by the partial combustion of oxygen and a solid reductant such as coke, char or coal fed into the upper section of the vessel. Again, such a system is not as economically or environmentally desirable as using a submerged arc furnace, but the submerged arc furnace cannot accommodate top charging of such fines.

A further proposal has been suggested to utilize fines in the production of steel by introducing sponge iron fines from a fluid bed reactor directly into a carbon-containing melt in a melting vessel, together with carbonaceous material and oxygen. This proposal fails to provide a process for producing pig iron using partially reduced and partially reacted fines from a fluidized bed reactor as a feed material in a submerged arc furnace.

There is therefore a need to develop a process for producing pig iron that can take full advantage of the abundance and variety of ore fines, and the environmental and economic benefits of a submerged arc furnace rather than, for example, a blast furnace, and without the need for briquetting, green balling, pelletizing or otherwise agglomerating the pre-reduced and pre-reacted fines discharged from a fluid bed reactor.

SUMMARY OF THE INVENTION

The present invention advantageously enables the production of pig iron from a wide variety of iron oxide containing ore fines, while at the same time taking advantage of the economic and environmental benefits of a submerged arc furnace, without the need to briquette, pelletize or otherwise agglomerate the fines. The process advantageously obviates the need for a blast furnaces, smelter/gasifiers, melt-reducing furnaces and the like, and enables the production of pig iron from heretofore unusable size grades of ores as fines.

In accordance with the above, the present invention provides a process for converting iron oxide containing ore fines into pig iron, comprising the steps of introducing said fines into at least one fluid bed reactor, partially reducing at least a portion of the fines by exposing them to a reactant gas in the fluid bed reactor, disposing at least a portion of the partially reduced fines in a charging device adapted to inject the fines below the surface of a bath of a submerged arc furnace, the bath comprising a slag layer above a molten iron layer, and injecting the partially reduced fines below the surface of the bath into at least one of the slag layer and the iron layer.

Preferably the reactant gas is predominantly hydrogen, but other reactant gases can be provided by combusting a carbonaceous fuel such as coal or natural gas. The process is preferably carried out continuously, with the fines discharged from the fluid bed reactor at an elevated temperature and hot injected below the surface of the submerged arc furnace bath. The carbon content of the partially reduced fines constituting the metallic iron can be controlled by exposing said reduced fines to a carburizing gas in the fluid bed reactor, prior to injecting the fines into the bath. The charging device is preferably a lance for injecting particulates entrained in a gas stream. Advantageously, in the preferred embodiment, the process of the present invention can use iron oxide fines ranging in size from as small as about 0.025 mm. to as large as about 3 mm., and of wide-ranging chemistry.

Many additional features, advantages and a fuller understanding of the invention will be had from the following detailed description of the preferred embodiments and the accompanying drawings.

DESCRIPTION OF THE DRAWINGS

FIG. 1 is a schematic flowsheet of a process in accordance with the present invention.

DETAILED DESCRIPTION OF THE PREFERRED EMBODIMENT

Referring to FIG. 1, the process for converting ore fines to pig iron according to the preferred embodiment may be generally described as follows. Ore fines 2 containing iron oxides are preheated to a suitable temperature of from about 500° to 1000° C. in one or more preheaters 4. Suitable preheaters, such as preheating cyclones or preheating kilns are known in the art and would be apparent to those of ordinary skill in the art in view of this disclosure. The ore fines may be preheated in an oxidizing atmosphere or in a reducing atmosphere by heating with less than a stoichiometric amount of oxygen.

The ore fines fed to the fluid bed reactor 10 can range from about 0.025 mm. to about 3 mm. in size, their size and size range dictated by the physical and operating requirements of the reactor. The use of fluid bed reactors, especially the preferred circulating fluid bed reactor(s), allows a high degree of flexibility with respect to acceptable fine size and size range, permitting the use of naturally occurring powdery taconite fines as well as ground ore fines produced during benefication processes and reclaimed waste fines resulting from abrasion and collision during transportation and processing of larger ore particles. Advantageously, by the novel use of a lance 12 or similar device to inject the ore fines into the submerged arc furnace, discussed in more detail below, the present invention does not require that the fines be agglomerated at any time prior to their injection in the submerged arc furnace.

Once the fines have been preheated to a suitable temperature they are introduced into a fluid bed reactor 10 through a feeder 8 such as a lock hopper or other pressure adjustment device as is known in the art. Preferably, the fluid bed reactor is operated at a pressure of from about 1 to about 20 atmospheres. Still more preferably, the pressure is from about 4 to 12 atmospheres and, most preferably, in excess of 6 atmospheres. The fines are fluidized by the flow of reactant gas in the reactor, which includes at least a reducing gas, and can also include a carburizing gas. In the later case a portion of the reduced metallic iron fines will be carburized. As used herein, ore fines containing iron oxide that have undergone a reduction reaction are termed "partially reduced" fines, and partially reduced fines that have undergone a carburizing reaction are termed "partially reacted" fines.

The reducing gas used in the fluidized bed reactor is preferably hydrogen, which combines with the oxide to produce water vapor. Oil, natural gas, coal or other carbonaceous fuels can be burned to supply the requisite reactant gas. It is contemplated that any reactant gas suitable for reducing the iron ore feed can be used in the fluid bed reactor of the present invention.

Depending on the characteristics of the desired product and the characteristics of the available feed, the present invention can utilize a plurality of fluid bed reactors connected in series. Furthermore, an embodiment of the present invention can control the reactor conditions so as to favor the reduction reaction in one or more reactors while favoring the carburization reaction in separate reactors. In the preferred embodiment, a single circulating fluid bed reactor 10 is utilized with a mixture of predominantly hydrogen and carburizing gases at least in part comprising recycled off gases to produce a particulate intermediate product having a carbon content of from 0 to not more than about 6.5%, with about 50% to about 85% of the feed partially reduced and about 0 to about 85% of the feed partially reacted.

In a preferred embodiment, at least a portion of the ore fines reduced to metallic iron are converted to an intermediate iron carbide product in a continuous process within the reactor in accordance with the following reaction sequence:

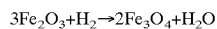

$$3Fe_2O_3 + H_2 \rightarrow 2Fe_3O_4 + H_2O$$

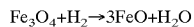

$$Fe_3O_4 + H_2 \rightarrow 3FeO + H_2O$$

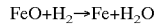

$$FeO + H_2 \rightarrow Fe + H_2O$$

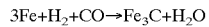

$$3Fe + H_2 + CO \rightarrow Fe_3C + H_2O$$

The physical characteristics of the reactor, as well as the operating conditions including feed rate, temperature, pressure, gas velocity and residence time can be adjusted to produce the particulate intermediate product having the desired chemical composition, as is known by those skilled in the art of fluidized bed reaction kinetics. It is contemplated that any fluid bed reactor adapted for the production of DRI from ore fines containing iron oxide is suitable for use in accordance with the present invention although, as will be apparent to those skilled in the art, the use of the preferred circulating fluid bed provides advantageous flexibility in the choice of feeds. Accessory modules for the operation of the fluid bed reactor can include temperature controls, heat exchangers, gas recyclers, scrubbers and other conventional units, and are known to those of ordinary skill in the art. Techniques for production of DRI and iron carbide from iron ore fines, and the fluid bed reactors used, are disclosed in, for example, U.S. Pat. Nos. 4,053,301, 5,366, 897, 5,073,194, 5,527,379 and 5,431,711, and are incorporated herein by reference.

In the preferred embodiment, fines having a carbon content of not more than about 6.5% are discharged from the fluid bed reactor. Preferably, the fines, irrespective of composition, are discharged from the fluid bed at a temperature of not less than about 300° C., more preferably not less than about 500° C., and still more preferably between about 550° and 750° C. The fines are then transported pneumatically in an insulated pipe as is known in the art to a charging device for injection below the surface of a bath of a submerged arc furnace 16. The carrier gas for transport can be an inert gas supplied from a conventional source to the partially reduced and optionally partially reacted fines after they have exited the fluid bed reactor and been separated from the reactant gas, for example by a cyclone or the like. Alternatively, a recycled gas stream comprising all or part of the off-gas from the furnace, or the discharge gas from the fluid bed reactor, or both, or any other suitable source, can be used to transport the fines.

In the preferred embodiment, the fines discharged from the fluid bed reactor are directly and continuously or semi-continuously hot charged below the surface of the bath in the submerged arc furnace. Since DRI easily reoxidizes in an ambient environment at elevated temperatures, conventional processes proceed to pelletizing or briquetting upon discharge from a partial reduction processing station. Direct hot charging as in the present invention reduces the power consumption in the furnace and avoids the expenses associated with cooling, agglomerating and transporting the fines discharged from the fluid bed reactor to storage or to a processing station.

The charging device of the preferred embodiment is a lance 12. Lances for injecting fluids and fluidized mixtures below the surface of a furnace bath are known and commonly used in the art of electric arc furnace steelmaking and other pyrometallurgical processes. Suitable lances and lance type devices, and the manner of adapting them for use in the present process, would be apparent to those of ordinary skill in the art in view of the instant disclosure. By way of example only, U.S. Pat. Nos. 3,998,625, 5,251,879 and 4,653,730, incorporated herein by reference, all describe lance devices suitable for use in the present invention. It is intended that any device capable of delivering a fluidized stream of fines below the surface of the bath of a submerged arc furnace, either by disposing the lance directly in the bath or by blowing the fines into the bath with suitable velocity to pierce the surface of the bath, can be used and fall within the scope of the present invention.

The location within the bath where the fines should be injected will depend on the composition of the fines and the composition of the desired product since, as is known in the art, the slag can react chemically with the feed to effect further reduction and the like. The charging device of the present invention preferably allows the fines to be discharged at any desired depth within the bath, including the slag layer, the slag iron interface or the iron layer. In another embodiment, the charging device or devices can provide the ability to discharge the fines at a plurality of depths simultaneously. Moreover, the charging device can be adapted to co-inject other components into the bath along with the fines, such as fluxes, slag modifying components, solid carbonaceous reactants and the like.

After a suitable reaction time, pig iron is tapped or otherwise discharged from the iron layer of the furnace. The process of the present invention can also be practiced by utilizing partially reduced and optionally partially reacted fines that have been suitably stored after discharge from the fluid bed reactor, but product loss will result from the additional handling of the fines, and the loss of thermal energy may result in additional expense.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A process for converting iron oxide containing ore fines into pig iron, comprising the steps of:

introducing said fines into at least one fluid bed reactor;

partially reducing at least a portion of said fines by exposing said fines to a reactant gas in said at least one fluid bed reactor;

directing at least a portion of said partially reduced fines into a charging device;

positioning said charging device so as to release said partially reduced fines in a submerged arc furnace containing a bath of molten metal, said bath comprising a slag layer above a molten iron layer;

injecting said partially reduced fines from said charging device below the surface of said bath into at least one of said slag layer and said iron layer; and forming pig iron in said submerged arc furnace.

2. The process according to claim 1 wherein said iron oxide containing ore fines range in size from about 0.025 mm. to about 3 mm.

3. The process according to claim 1 wherein said reactant gas comprises hydrogen and one or more gases selected from carbon dioxide, carbon monoxide, methane and propane.

4. The process according to claim 1 wherein said reactant gas consists essentially of hydrogen.

5. The process according to claim 1 comprising at least partially reducing said fines in a circulating fluid bed reactor.

6. The process according to claim 1 wherein said charging device is a lance.

7. The process according to claim 1 wherein said charging device is a lance, and comprising disposing a portion of said lance within said bath and injecting said partially reduced fines from said portion of said lance directly into said bath below the surface.

8. The process according to claim 1 wherein said charging device is a lance, and comprising disposing said lance above the surface of said bath and injecting said partially reduced fines from a location of said lance above said bath into said bath below the surface.

9. The process according to claim 1 wherein said partially reduced fines are injected at a temperature of not less than about 500° C.

10. The process according to claim 1 wherein said partially reduced fines are discharged from said at least one fluid bed reactor at a temperature of not less than about 500° C., and while still hot, continuously disposed within said charging device and injected below the surface of said bath of said submerged arc furnace.

11. The process according to claim 1 wherein said reactant gas comprises a reducing gas and a carburizing gas.

12. The process according to claim 1 comprising partially reacting at least a portion of said partially reduced fines to form iron carbide fines by exposing said partially reduced fines to a carburizing gas in said at least one fluid bed reactor.

13. The process according to claim 1 comprising partially reducing said iron oxide containing ore fines in a first fluid bed reactor by exposing said fines to a reducing gas in said first fluid bed reactor, and partially reacting said partially reduced fines in a second fluid bed reactor by exposing said fines to a carburizing gas in said second fluid bed reactor.

14. The process according to claim 12 or 13 wherein between about 50 to about 85% of said ore fines are partially reduced and about 0 to about 85% of said ore fines are partially reacted.

15. A process for converting iron oxide containing ore fines into pig iron, comprising the steps of:

introducing said fines into a fluid bed reactor;

partially reducing at least a portion of said fines by exposing said fines to a reducing gas in said fluid bed reactor to reduce at least a portion of said fines to metallic iron fines;

continuously discharging said partially reduced fines from said fluid bed reactor at a temperature of not less than about 500° C. and, while hot, continuously directing said fines into a charging device;

positioning said charging device so as to release said partially reduced fines in a submerged arc furnace containing a bath of molten metal, said bath comprising a slag layer above a molten iron layer;

continuously injecting said fines from said charging device below the surface of said bath into at least one of said slag layer and said molten iron layer; and forming pig iron in said submerged arc furnace.

16. The process according to claim 15 wherein said ore fines range in size from about 0.025 mm. to about 3 mm.

17. The process according to claim 15 comprising exposing said metallic iron fines to a carburizing gas in said at least one fluid bed reactor to convert at least a portion of said metallic iron fines to iron carbide fines.

18. The process according to claim 15 wherein said reducing gas is hydrogen.

19. The process according to claim 15 wherein said charging device is a lance.

20. The process according to claim 15 wherein said charging device is a lance, and comprising disposing a portion of said lance within said bath and injecting said partially reduced fines from said portion of said lance directly into said bath below the surface.

21. The process according to claim 15 wherein said charging device is a lance, and comprising disposing said lance above the surface of said bath and injecting said partially reduced fines from a location of said lance above said bath into said bath below the surface.

22. The process according to claim 15 wherein said fluid bed is a circulating fluid bed.

23. A process for converting iron oxide containing ore fines into pig iron, comprising the steps of:

introducing said fines into at least one fluid bed reactor;

partially reducing at least a portion of said fines by exposing said fines to a reactant gas in said at least one fluid bed reactor;

directing at least a portion of said partially reduced fines into a lance that includes at least one nozzle, positioning said at least one nozzle below a surface of a bath of molten metal contained by a submerged arc furnace, said bath comprising a slag layer above a molten iron layer;

injecting said partially reduced fines from each said nozzle into at least one of said slag layer and said iron layer; and forming pig iron in said submerged arc furnace.

24. The process according to claim 23 comprising making steel in another furnace using said pig iron.

25. The process according to claim 1 wherein iron oxide fines are only added to said bath by injection below the surface of said bath.

26. The process according to claim 15 wherein iron oxide fines are only added to said bath by injection below the surface of said bath.

* * * * *